United States Patent [19]

Edwards et al.

[11] 4,440,101
[45] Apr. 3, 1984

[54] PLANT TRANSFER MECHANISM

[75] Inventors: Bryant Edwards, Clarendon Hills; Stanley R. Krogman, Bartlett; Edward J. McArdle, Morton Grove, all of Ill.

[73] Assignee: Illinois Tool Works Inc., Chicago, Ill.

[21] Appl. No.: 298,859

[22] Filed: Sep. 3, 1981

Related U.S. Application Data

[63] Continuation of Ser. No. 104,940, Dec. 18, 1979, abandoned.

[51] Int. Cl.$^3$ ............................................. A01C 11/00
[52] U.S. Cl. ........................................... 111/2; 111/3; 198/440; 221/217
[58] Field of Search ............... 111/2, 3; 198/436, 445, 198/447, 451, 426, 427, 479, 696, 431, 432, 433, 440, 443, 449, 490; 221/68, 219, 217, 218

[56] References Cited

U.S. PATENT DOCUMENTS

| 469,506 | 2/1892 | Simmons | 111/3 |
| 2,936,059 | 5/1960 | Hakogi | 198/443 |
| 3,221,681 | 12/1965 | Snyder et al. | 111/3 |
| 3,338,370 | 8/1967 | Maulini | 198/421 |
| 3,712,252 | 1/1973 | Huang | 111/2 |
| 4,156,395 | 5/1979 | Edwards et al. | 111/3 |
| 4,244,725 | 1/1981 | Fenton | 198/490 X |

FOREIGN PATENT DOCUMENTS

| 2013629 | 10/1971 | Fed. Rep. of Germany | 111/3 |
| 484659 | 9/1975 | U.S.S.R. | 111/3 |

Primary Examiner—William Pieprz
Assistant Examiner—David A. Wiecking
Attorney, Agent, or Firm—Thomas Buckman

[57] ABSTRACT

An apparatus for high-speed transfer of plants from an array arranged in ranks and rows to a transplanting location. The apparatus incorporates structure which positively locates and stabilizes the individual plants during their path of travel from the array to their predetermined transplanting location as well as structure which permits each rank of the array to be removed as a unit for transfer to the path of travel. The apparatus is also designed to eliminate the top growth of each plant from interfering with individual placement and movement of the plants.

2 Claims, 5 Drawing Figures

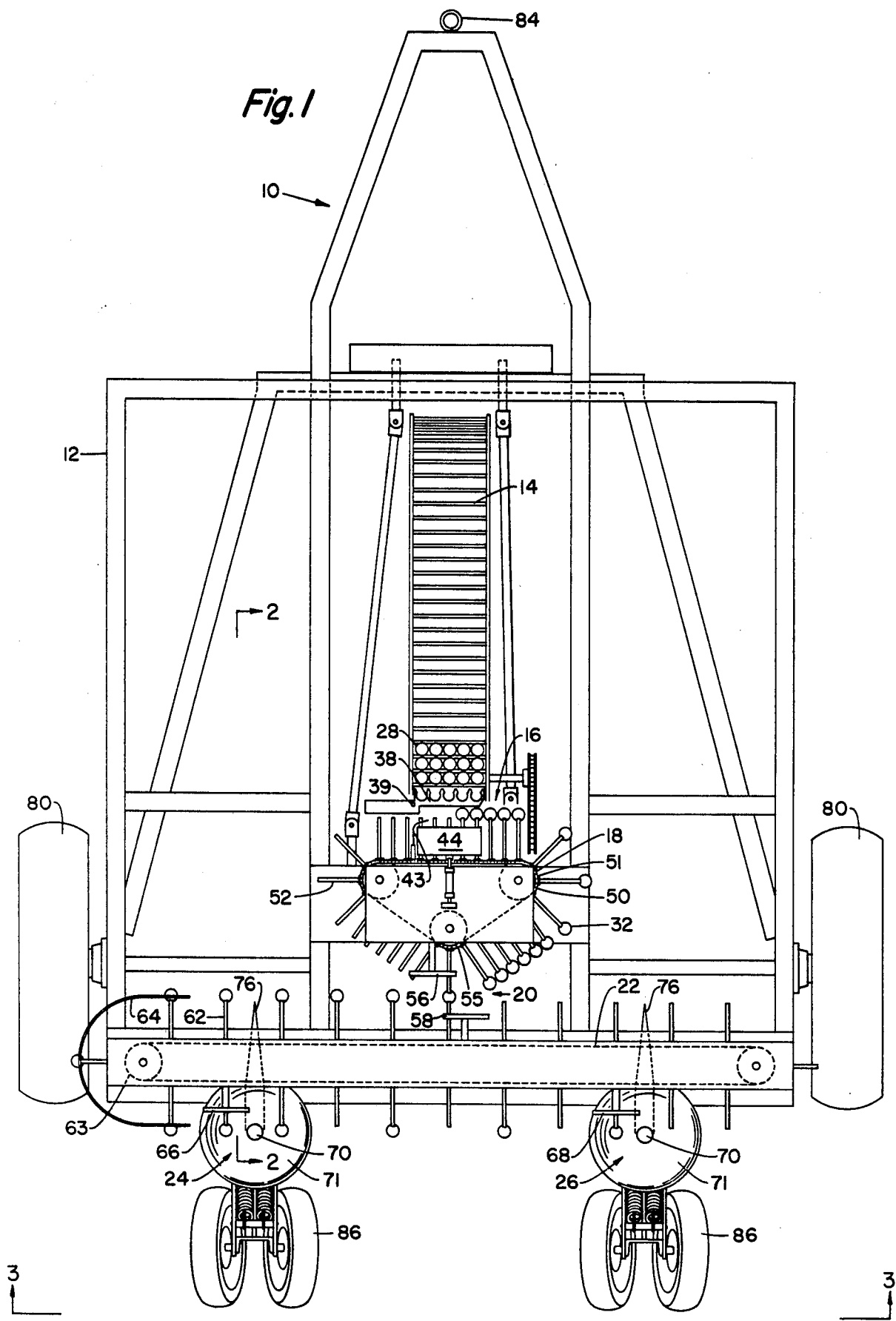

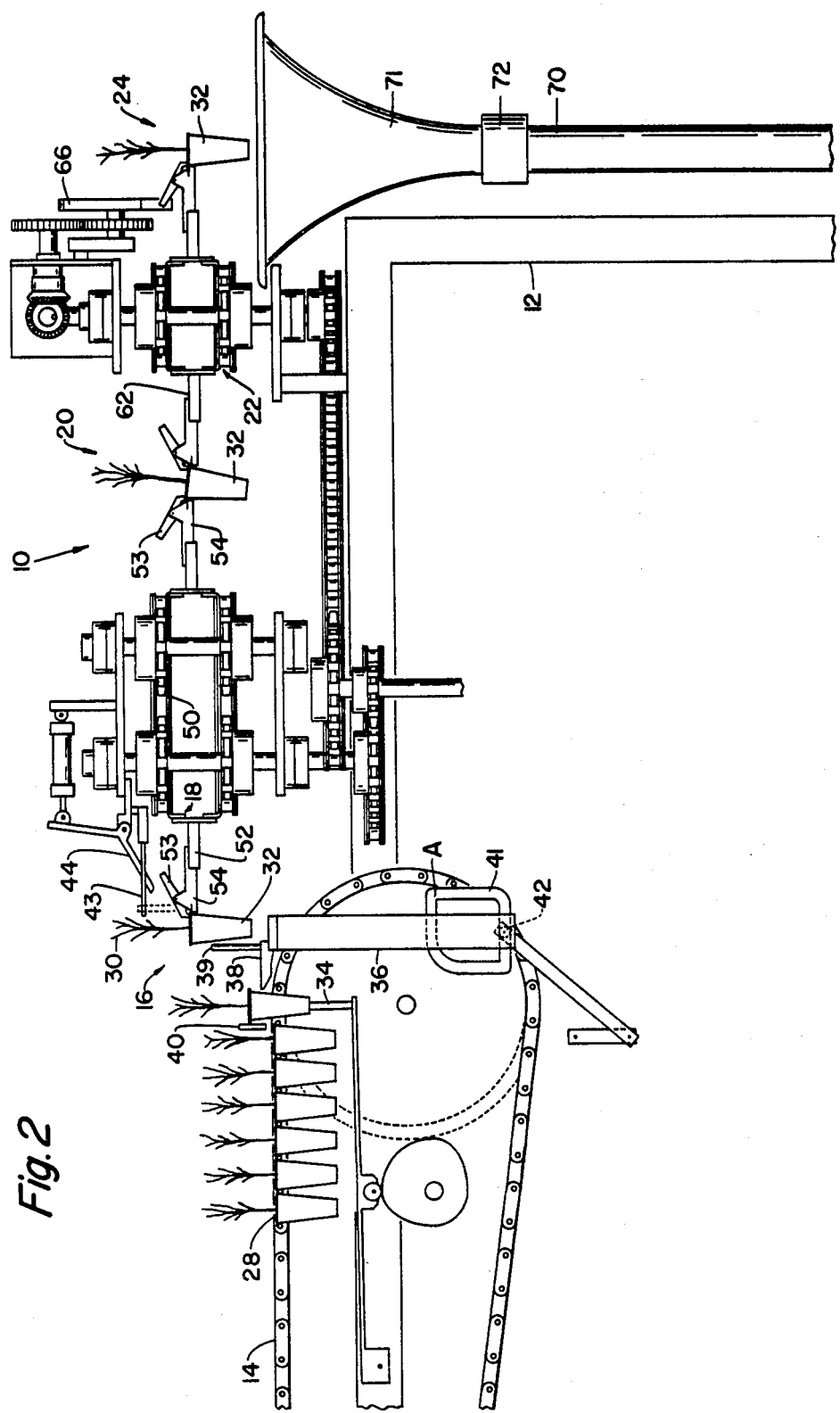

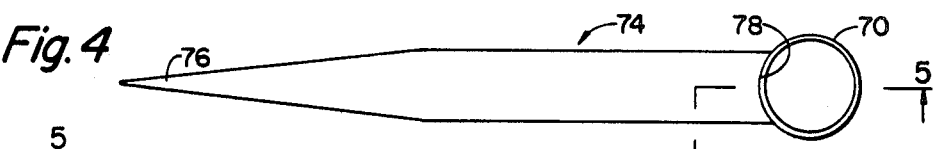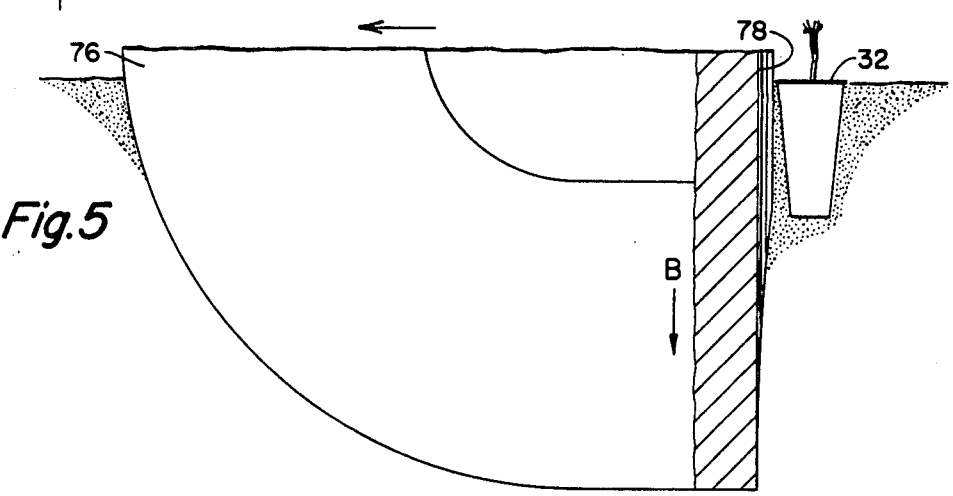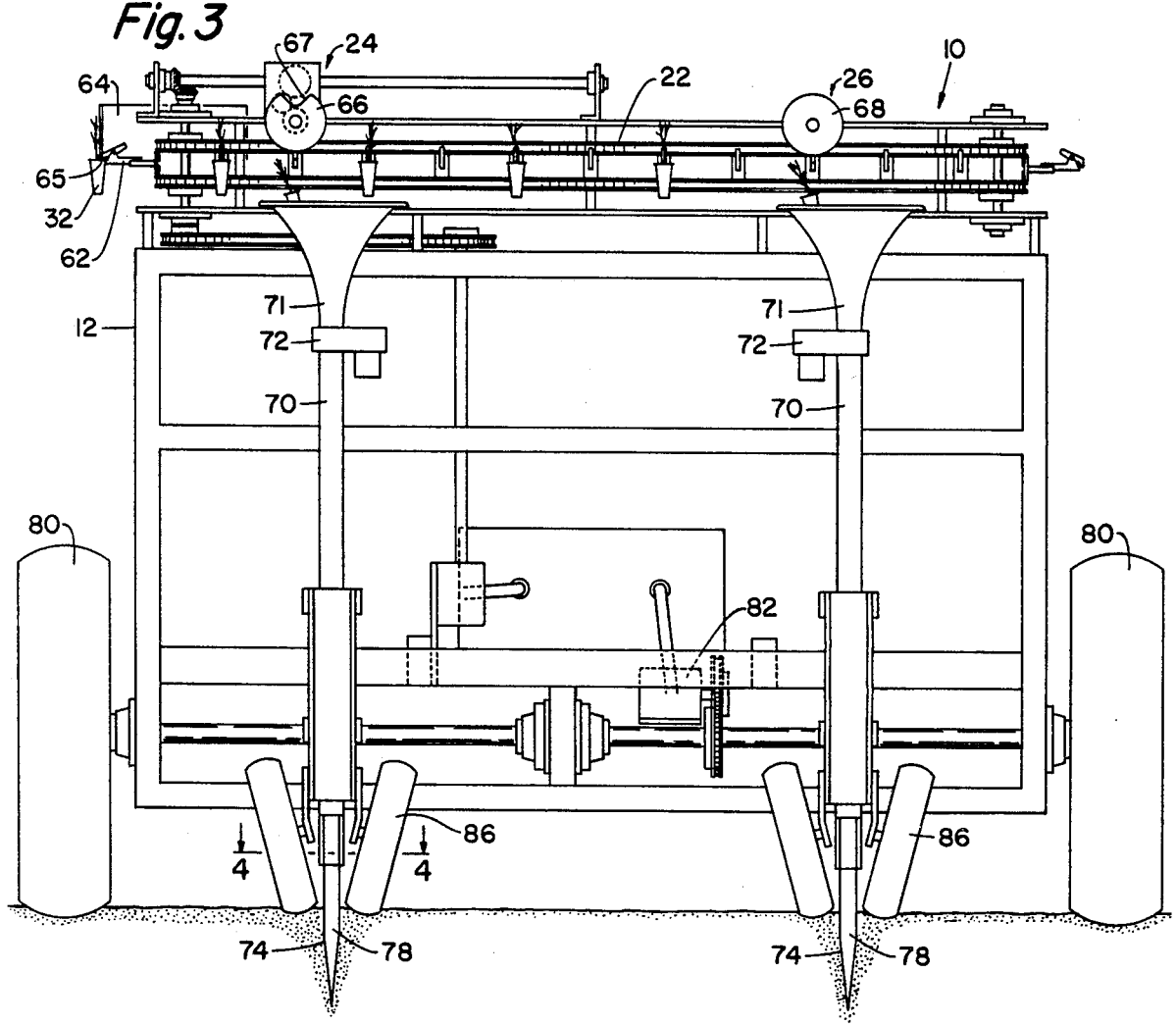

PLANT TRANSFER MECHANISM

This is a continuation, of application Ser. No. 104,940, filed 12/18/79 now abandoned.

BACKGROUND OF THE INVENTION

This invention relates broadly to machines which will transfer individual growing plants from an array of such plants to a transplanted location.

The most commonly known method and machine for transplanting plants, as a machine travels over the ground, is an arrangement wherein a person, while seated on the machine, manually takes one plant at a time from a group or array of plants and deposits each plant in a setting mechanism. The maximum speed of such techniques is generally limited by the rate at which a person can pick up a plant and place it in the transfer mechanism.

A number of other prior art patents are known which attempt to increase the speed of planting by some sort of mechanized device utilizing tapes, belts, ribbons, etc.

U.S. Pat. No. 4,156,395 broadly describes a method and machine for removing a plurality of plants from an array and transplanting the plants on an individual basis through the use of a plurality of conveyors. This patent particularly describes an input conveyor system which will handle a web of plant carrying containers which are relatively fixed thereto in rows and ranks. Each successive rank of the array is pushed upwardly from the web and deposited on a pivoting plate which permits the individual plants to fall by gravity onto a belt-type conveyor. The plants are then transferred to another belt-type conveyor moving in a direction transverse the direction of the path of the first conveyor.

While the system described in U.S. Pat. No. 4,156,395 is adequate in its handling of the web and ejection of individual plants from the web, a more reliable and efficient technique of transferring the individual plants to a transplanting location is necessary in order to achieve high, efficient production rates.

SUMMARY OF THE INVENTION

Against the foregoing background, the present invention affords a highly reliable, high-speed mechanism for transferring a plurality of plants from a fixed array to predetermined transplanting locations. Like the device and method shown in the U.S. Pat. No. 4,156,395, each successive rank of individual plants in an array are removed from the array and positioned successively on a pair of intersecting conveyor paths. However, unlike the device described in this patent, the transfer mechanism from the array to the conveyor paths and from the one conveyor path to another are uniquely structured to provide a positive and stabilized handling of each individual container. In further contrast to the above prior art device methods, each conveyor path includes individual grasping means to positively hold each individual plant at accurately and carefully spaced intervals relative to one another. The individual gripping or grasping means also enables the plants to be vertically stable throughout the transfer path.

The positive gripping and vertical control of the plants in each and every stage of their transfer from the array to their transplanted location is important in a high-speed operation where the plants themselves may be relatively light and unstable. Furthermore, since the plants will have a certain amount of top growth, their original positionment in a closely packed array will require careful techniques for separating the top growth from adjacent plants. The present invention incorporates several paths within the transfer mechanism which serve to separate the top growths of adjacent plants from one another. In conjunction with particular paths which separate the top growths, the spacing between the individual plants is increased as the plants approach the region where they are dropped to their appropriate transplanting space.

One of the important uses of this transplanting transfer mechanism is in direct planting of the individual plants into the ground at carefully spaced locations as the machine travels over them. With this in mind, a novel plow and plant setting device is disclosed herein which permits the rapid and careful placement of each individual plant behind the plow mechanism. The plow and plant setting device is dimensioned and configured to insure that the plants are positioned substantially vertically in the furrow and are substantially immediately retained in that position by the surrounding dirt.

While an embodiment of the invention is shown and described relative to the use of the plow in an over-the-ground mechanism, it should be understood that the transfer mechanism can be utilized as a stationary device for transplanting or repositioning the individual plants from a fixed web to other positions, such as larger containers which may move on a path relative to the exit area of the transfer mechanism or to a larger container or area for hand transplanting.

The primary object of the invention is to provide a device for high-speed transfer of individual plants from an array to discrete locations for each individual plants.

A further object of the invention is to provide efficient and stabilized handling of individual plants including the removal of a plurality of such individual plants from an array of plants.

An advantage of the invention of this application is the adaptability of the transfer mechanism for an over-the-ground planting apparatus and the unique planting efficiency afforded by a plant setting plow which is configured to place plants in a stable, upright, condition in furrows.

BRIEF DESCRIPTION OF THE DRAWINGS

FIG. 1 is a top plan view of the transfer mechanism in a preferred embodiment of the invention.

FIG. 2 is a partial side elevation view of the transfer mechanism as taken in the direction of lines 2—2 of FIG. 1.

FIG. 3 is an end elevation view of the transfer mechanism as taken along lines 3—3 of FIG. 1.

FIG. 4 is an enlarged sectional view as taken along the lines 4—4 of FIG. 3 showing the plow and plant setting device.

FIG. 5 is an enlarged sectional view as taken along lines 5—5 of FIG. 4 showing the plow and container immediately after placement of the container in a furrow.

DETAILED DESCRIPTION OF THE PREFERRED EMBODIMENTS

The plant transfer mechanism 10 probably is best described by first referring to FIG. 1. Mechanism 10 is carried on a rigid frame 12 which, as will be pointed out later herein, may either be an over-the-ground attachment to a tractor through attachment means 84 or the like or may be a stationary transfer mechanism.

The input conveying aspects of the transfer mechanism 10 can best be illustrated with reference to U.S. Pat. No. 4,156,395. In this patent a high-speed planting machine and method are shown, utilizing an input conveyor 14 adapted to handle web which defines a plant carrying array utilizing a thin sheet of plastic material thermoformed to have a plurality of sleeves or pockets depending from the upper surface thereof. The sleeves are arranged in a fixed array of ranks and rows. Typically, the sleeves will carry skeletal frame members which in turn carry the plants and planting medium. The input conveyor system, utilized in mechanism 10, for indexing a web 28 carrying an array of ranks and rows of plants 30 to a first transfer station 16, is preferably similar to the input conveyor system described in U.S. Pat. No. 4,156,395 and to that extent froms no part of the instant invention. As the web 28 proceeds to the first transfer station 16, a plant ejection mechanism 34 is utilized to partially force up each individual plant or plant container from the successive ranks of the web. The initial partial ejection of plants from webs is similar to that shown in the previously mentioned patent and, therefore, discussion of that aspect of this transfer mechanism is not deemed necessary at this time.

As each successive rank of plants 30, preferably in plant containers 32, are indexed by the appropriate indexing mechanism to a first transfer station 16, the ranks of plants are first, partially forced upwardly from the web, as shown in FIG. 2, and are secondly, completely removed from the web and transferred in a controlled fashion, as a unit, to a first conveyor 18.

The first conveyor includes a series of equally spaced positively gripping devices continuously moved about a closed path. The closed path of the first conveyor 18 becomes substantially tangent to the closed path of a similar, second conveyor 22. A second transfer station 20 at the juncture of these first and second conveyors is designed to accomplish a controlled exchange of each successive individual plant from its positive retention on the first conveyor to a similar positive retention on the second conveyor. The second conveyor 22, being similar to first conveyor 18, includes a series of equally spaced positive gripping devices identical to those carried by the first conveyor. The conveyor 22 carries the plants to discharge stations 24 and 26. It should, however, be noted that the spacing between positive gripping devices 52 on the first conveyor is different and significantly less than the spacing between positive gripping devices 62 on the second conveyor. A more detailed discussion on each of the transfer stations and conveyors will facilitate an understanding of the general arrangement just described.

First Transfer Station and Conveyor Path

A fixed array of plants 30, in a web 28, are suitably indexed to first station 16 as discussed above. Each plant is preferably carried in individual skeleton-type frames 32 having a plurality of tapered spaced ribs connecting a closed bottom wall to a ring-like integral rim at the upper extremity. After the first rank of plants are moved axially upwardly a short distance from the web as a unit using an ejection assisting mechanism 34, a transfer mechanism removes each rank of plants as a unit, completely out of the web and then carries the rank of containers longitudinally, in the machine direction, toward a first segment of the first conveyor 18. The transfer mechanism includes a transfer bar 36 having a comb-like grasping bar 38, extending laterally of the machine. Grasping bar 38 includes a plurality of equally spaced C-shaped openings to partially surround the plants, designed to accept, in axial retention, the upper extremities of each container 32. The motion of transfer and grasping bars 36 and 38 is controlled by a face cam 41 fixedly mounted to the frame 12 and cam follower 42 mounted to bar 36. The transfer mechanism is controlled to operate in an orbital manner. In operation, the grasping bar 38 first moves outwardly longitudinally of the machine away from conveyor 18 so each C-shaped opening underlies the rims of an associated container 32. The bar carrying a rank of containers is next moved upwardly to remove the rank completely from the web to an elevation approximately that of the elevation of the clips 52 which are formed on the first conveyor 18. The next movement of the comb is longitudinally toward the direction of the grasping clips 52.

It should be noted that a rod 39 is formed on the upper surface of the comb bar 38 and extends perpendicular thereto. This rod has two functions. A first function of the bar is to depress a switch control 43 which in turn activates a solenoid controlled hinged plate 44 which operates to compress the upper resilient jaw or lever 53 of the clip 52 to simultaneously open a plurality of such clips equal in number to the number or rows in the array. A second function of rod 39 is to insure that the bar 38 travels laterally of the machine with the speed of the conveyor 18 to insure efficient positive transfer of the plants to individual gripping clips 52. The rod is interleaved between two adjacent clips 52 and is, therefore, forced to move with the conveyor 18. As the bar 38 so moves a slight distance for a slight period of time, contact of rod 39 with the switch 43 releases and the upper jaws 53 are released so the rim of the container is resiliently clamped between jaws 53 and 54. The bar 38 and its carrying bar 36 is spring biased to return to its original lateral position for successive identical transfer operations.

A slight dwell in the orbital motion of the transfer is necessary to permit the movement of the transfer bar 36 transversely of the machine at the speed of the conveyor 18. This dwell is created through the action of the crank which is axially resilient when the cam follower reaches region A of the cam. The cam follower is forced into the corner A and is stationary relative to the cam for the short period of time necessary for the dwell.

Each clip 52 is cantilever mounted to a continuous chain-like member 50. The bases of each clip are spaced equally from one another a predetermined distance equal to the spacing between the centers of the rows in the array. However, it should be noted that curved region 51 of the path of conveyor 18 forces the grasping extremities of each clip to increase their spacing from one another. This has the advantage of disentangling top growths of adjacent plants, at least temporarily. The clips 52 are shown as alligator-type clips having an upper and lower jaw members 53 and 54 spring biased to a closed position. It should be understood that for purposes of this invention the clips could be operable to open and close in a horizontal plane rather than a vertical plane to grasp the plants in the body section rather than at a rim of a container.

Second Transfer Station and Conveyor

Conveyor 18 is located so as to present a closed travel path with a second segment 53 which approaches a point of tangency with the path of travel of a second conveyor 22. It is at this point of tangency that the second transfer station 20 is located. Second conveyor 22 is of a construction similar to conveyor 18 including an endless chain carrying a succession of clips 62 which are identical to clips 52. However, the spacing between the bases of adjacent clips 62 is sufficiently greater than the spacing between the bases of adjacent clips 52. As each successive clip 62 on conveyor 22 approaches the second transfer station 20, the upper jaw of the clip is contacted by a rotary cam disc 58. With the second conveyor 22 traveling in a counterclockwise direction and the first conveyor 18 traveling in a clockwise direction, the clips 62 on conveyor 22 are opened slightly before the clips 52 on conveyor 18. In fact, the circular disc cam 58 opens and closes the clips so that the clips on the second conveyor grip the containers 32 prior to the release of the containers by the clips on the first conveyor. As the conveyor 18 continues, each successive clip 52 is contacted by a similar circular cam disc 56. Thus, permitting the grasping of clip 52 on the container to be released and permitting the containers to be positively controlled and carried by the second conveyor.

Conveyor path 22 includes a 180° curved region 63 permitting the movement of the containers transverse the machine to be reversed. At this region, the spacing between extremities of the clips 62 is increased again, disentangling any top growth conflict between adjacent containers. It should also be noted this curved region 63 includes a curved stabilizing plate 64 positioned so that its lower edge 65 lies on a horizontal plane to contact the upper edge of the rims of plant containers 32 to locate and stabilize them in a vertical position and provide additional positive alignment to each of the containers as they are moved with increased velocity about the curved path. After the plants pass through region 63, they are then in proper condition to be released for planting or setting.

Plant Release Stations

After exiting the curved region 63 of the second conveyor, the plants, carried by successive, equally spaced slips 62 proceed along a straight path transverse the machine. The plants are then selectively released from the grip of the clips at a predetermined location or locations. The embodiment shown in FIGS. 1, 2 and 3 includes the transfer mechanism 10 in a moving device designed to plant a plurality of rows of plants in a field. For that purpose, the clips 62 are opened at a plurality of predetermined locations behind the mechanism 10. In the embodiment shown herein, a two-row planting device is used incorporating this invention. However, it should be apparent that more or less than two rows could be planted using the teachings of this invention. A plant discharge tube 70 with a large funnel-type opening 71 is positioned directly, vertically above a plow 74. A driven, cam disc 66 similar to cam discs 56 and 58 discussed above is positioned above the funnel to selectively engage and release alternate adjacent clips 62. A notch 67 is included in one segment of the periphery of the cam so that only every other clip is engaged and opened. The disc 66 will be timed to insure this action. As the remaining plants continue along the path, the clips 62 approach a second predetermined location having an identical discharge tube 70 with a similarly configured funnel 71. At this point a freely spinning cam wheel 68 contacts each of the clips 62, releasing the remaining containers from gripping retention thereon. Each of the discharge tubes may include a vacuum-assist device powered by a motor 72 which will serve to positively drive the plants downwardly.

The transfer mechanism just described has been found to be particularly useful in an over-the-ground planting mechanism. Therefore, directly beneath each vacuum assisted discharge tube is positioned a uniquely designed plow and plant setting device. This device is shown in FIGS. 1 and 3 and in greater detail in FIGS. 4 and 5. The plow 74, which is adjustably mounted in front of furrow tamping wheels 86, includes a sharp leading edge 76 extending from the top of plow and continuously extending toward recess 78 and a recessed trailing surface 78. As noted above, a preferred plant container 32 is of a frustoconical design having a predetermined sidewall taper from the lower wall to the upper rim. The recessed trailing surface 78 is provided with the same angle of taper upwardly and outwardly as the container so that the concave walls of the recess conform to the outer surface configuration of the container as the container slides down the recess. More importantly, as shown in FIG. 4 the recess has a maximum transverse dimension which is generally equal to the maximum transverse dimension of the plow, which is in the trailing region of the plow. The depth of the recess at any given location axially in downward direction of arrow B in FIG. 5 of the plow is generally one-half the transverse dimension of the trailing section at that axial location. Likewise, the maximum transverse dimension of the container is approximately equal to but not substantially greater than the maximum transverse dimension of the trailing section. With such a relationship, it will be shown that the side walls of the container protrude slightly beyond the maximum dimension of the plow over the entire length of the recess and container combination. With such a relationship and with the creation of a very narrow furrow by the blade, the plant is immediately grasped by the sidewalls of the furrow, in an upright position, and retained there so that the plants are positively embedded within the furrow as the plow moves across the field. This effect is enhanced by forcing the plant into the recess by the vacuum assist discharge tube.

As noted above, the preferred embodiment of the transfer mechanism is utilized in a plow wherein the frame 12 is an integral part of an attachment to a tractor. The attachment is provided with ground wheels 80 and the transfer mechanism can be adapted to be driven at the speed of the ground wheels or may be driven independently at a different speed.

However, it should be noted that the transfer mechanism could be a stationary mechanism adapted to move individual plants from a fixed array to individual secondary containers at a high speed. In such an embodiment such secondary containers can be conveyed transversely past the bottommost extremity of the discharge tubes so that the containers 32 may be forcefully injected into such secondary containers for storage, resale, etc. It should also be apparent that other planting operations could also be incorporated along the path of the secondary containers, such as filling, dibbling, water, etc. It is intended that the true scope of the invention cover such a stationary use of the transfer mechanism as well as the use of the transfer mechanism on over-the-ground planting devices.

From the above description of the preferred embodiments of the invention, those skilled in the art will readily understand the inherent capability and advantage of this machine for high-speed, positively controlled transplanting of plants from a fixed array to selected predetermined locations. The positive retention of each individual plant at all segments of its transfer path from the fixed array is an important aspect of the invention.

It is thus apparent that there has now been provided, in accordance with the invention, a transfer mechanism that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. An apparatus forming a part of a machine for planting the individual plants as the machine moves forwardly over the ground, further including plow means wherein the means to release the individual plants from the second conveyor are aligned above the plow means, wherein the plow means includes a front blade section in the direction of movement of the machine and a rear plant receiving and setting section, the plant receiving and setting section comprising a concave surface recess, the maximum depth of the recess of the rear section being generally not greater than one-half the maximum transverse dimension of the plant associated therewith, the individual plants include a frame device defining a generally frustoconical peripheral configuration and including an upper ring and lower base region connected by ribs inclined upwardly from the base to the ring at a predetermined angle, wherein the walls of the plant receiving recess are tapered at the same angle as the taper of the ribs on the frame to provide a supporting, conformal mating association between the plant and plant receiving and setting section for transferring plants along a predetermined path from an array of such plants arranged in ranks and rows to predetermined locations spaced from said array, means for moving said array so that each successive rank of individual plants is adjacent a first transfer station in said apparatus, means at said first transfer station to, at least partially, separate each successive rank of individual plants, as a group, from said array, a first conveyor means for moving individual plants along a portion of said path, the first conveyor means including a plurality of individual, spaced grasping means having grasping extremities thereon, the first conveyor means further being configured and located to include a first predetermined segment thereof as part of the first transfer station which segment is generally parallel to each successive rank of individual plants in the array, the spacing between the grasping extremities of adjacent grasping means in said predetermined segment being generally equal to the centerline spacing between adjacent individual plants in ranks in the array, a second transfer station including part of said first conveyor means and part of a first predetermined segment of a second, adjacent, conveyor means, the second transfer station including means including a curved path region on the first conveyor means to change the spacing between individual plants from the spacing between rows to a greater spacing, the second conveyor means including a plurality of individual spaced grasping means spaced a greater distance from one another than the spacing of the grasping means on the first segment of the first conveyor and means to release the individual plants from successive grasping extremities of the second conveyor means at a predetermined location relative to the apparatus wherein each individual plant is positively retained and controlled throughout the transfer process to insure a reliable transfer from the array to the setting of each plant in a predetermined location.

2. An apparatus for transferring plants along a predetermined path from an array of such plants arranged in ranks and rows to predetermined locations spaced from said array, means for moving said array so that each successive rank of individual plants is adjacent a first transfer station in said apparatus, means at said first transfer station to, at least partially, separate each successive rank of individual plants, as a group, from said array, a first conveyor means for moving individual plants along a portion of said path, the first conveyor means including a plurality of individual, spaced grasping means having grasping extremities thereon, the first conveyor means further being configured and located to include a first predetermined segment thereof as part of the first transfer station which segment is generally parallel to each successive rank of individual plants in the array, the spacing between the grasping extremities of adjacent grasping means in said predetermined segment being generally equal to the centerline spacing between adjacent individual plants in ranks in the array, a second transfer station including part of said first conveyor means and part of a first predetermined segment of a second, adjacent, conveyor means, the second transfer station including means including a curved path region on the first conveyor means to change the spacing between individual plants from the spacing between rows to a greater spacing, the second conveyor means including a plurality of individual spaced grasping means spaced a greater distance from one another than the spacing of the grasping means on the first segment of the first conveyor and means to release the individual plants from successive grasping extremities of the second conveyor means at a predetermined location relative to the apparatus wherein each individual plants is positively retained and controlled throughout the transfer process to insure reliable transfer from the array to the setting of each plant in a predetermined location, wherein the grasping means are spring biased clips with upper and lower jaw sections adapted to resiliently grip the plants, the means to release the individual plants including a cam means adjacent the path of the second conveyor and adapted to engage a lever associated with one of said jaw sections to move the jaw sections apart, thus releasing the plant carried thereby, including a further cam means adjacent the path of the second conveyor at a position prior to that of the first mentioned cam means, said further cam means being rotatably driven at the speed of the second conveyor and including a notch in the periphery of the cam means permitting alternating successive grasping means to move past said further cam means for releasing association with said first mentioned cam means.

* * * * *